United States Patent
Heimann et al.

(10) Patent No.: US 11,292,040 B2
(45) Date of Patent: Apr. 5, 2022

(54) METHOD AND SYSTEM FOR THE OPEN-LOOP AND/OR CLOSED-LOOP CONTROL OF A HEATING OF A CAST OR ROLLED METAL PRODUCT

(71) Applicant: SMS Group GmbH, Duesseldorf (DE)

(72) Inventors: Thomas Heimann, Iserlohn (DE); Heinz-Juergen Oudehinken, Essen (DE); Christoph Hassell, Duisburg (DE)

( * ) Notice: Subject to any disclaimer, the term of this patent is extended or adjusted under 35 U.S.C. 154(b) by 694 days.

(21) Appl. No.: 15/774,629

(22) PCT Filed: Nov. 4, 2016

(86) PCT No.: PCT/EO2016/076660
§ 371 (c)(1),
(2) Date: May 9, 2018

(87) PCT Pub. No.: WO2017/092967
PCT Pub. Date: Jun. 8, 2017

(65) Prior Publication Data
US 2018/0345342 A1    Dec. 6, 2018

(30) Foreign Application Priority Data

Nov. 30, 2015  (DE) .................... 10 2015 223 767.2
Jan. 7, 2016   (DE) .................... 10 2016 200 077.2

(51) Int. Cl.
  *B21B 37/74*    (2006.01)
  *B22D 11/12*    (2006.01)
  (Continued)

(52) U.S. Cl.
  CPC .............. *B21B 37/74* (2013.01); *B21B 1/22* (2013.01); *B22D 11/1213* (2013.01);
  (Continued)

(58) Field of Classification Search
  CPC ...................................................... B21B 37/74
  See application file for complete search history.

(56) References Cited

U.S. PATENT DOCUMENTS

| 7,449,140 B2 | 11/2008 | Klaus |
| 8,170,853 B2 | 5/2012 | Klaus |

FOREIGN PATENT DOCUMENTS

| CN | 101934295 | 1/2011 |
| CN | 104384469 | 3/2015 |

(Continued)

OTHER PUBLICATIONS

English machine translation of WO 2013/034463 A1 of Sprock published Mar. 14, 2013 (Year: 2013).*

*Primary Examiner* — Jophy S. Koshy
(74) *Attorney, Agent, or Firm* — Abelman, Frayne & Schwab; Stefan Knirr

(57) ABSTRACT

The invention relates to a method for the open-loop and/or closed-loop control of a heating of a cast or rolled metal product, comprising the following steps: —determining the total enthalpy of the metal product from a total of the free molar enthalpies (Gibbs free energy) of all phases and/or phase fractions currently present in the metal product; —determining a temperature distribution within the metal product by means of a dynamic temperature calculation model by using the determined total enthalpy; and —open-loop and/or closed-loop controlling of the heating of the metal product according to at least one initial variable of the temperature calculation model.

6 Claims, 11 Drawing Sheets

(51) Int. Cl.
*B22D 27/04* (2006.01)
*B22D 11/22* (2006.01)
*G01K 7/42* (2006.01)
*F27B 9/40* (2006.01)
*B21B 1/22* (2006.01)
*C21D 1/26* (2006.01)
*C21D 11/00* (2006.01)
*F27B 9/30* (2006.01)

(52) U.S. Cl.
CPC ............... *B22D 11/22* (2013.01); *B22D 27/04* (2013.01); *C21D 1/26* (2013.01); *C21D 11/00* (2013.01); *F27B 9/40* (2013.01); *G01K 7/427* (2013.01); *B21B 2001/225* (2013.01); *B21B 2261/21* (2013.01); *F27B 9/30* (2013.01); *G01K 2213/00* (2013.01)

(56) References Cited

FOREIGN PATENT DOCUMENTS

| | | |
|---|---|---|
| DE | 102011082158 | 3/2013 |
| DE | 102012224502 | 7/2014 |
| WO | 2011009819 | 1/2011 |
| WO | 2013034463 | 3/2013 |

\* cited by examiner

Material low carbon

Analysis (%):

C= 0.060  Si=0.020  Mn=0.310  P=0.018  S=0.007  Cu=0.000
Cr=0.020  Ni=0.020  Al=0.027  Mo=0.000  Ti=0.000
V=0.000  Nb=0.000  W=0.000

Source: calculated (Gibbs)

Material low carbon

Analysis (%):
C= 0.060  Si=0.020  Mn=0.310  P=0.018  S=0.007  Cu=0.000
Cr=0.020  Ni=0.020  Al=0.027  Mo=0.000  Ti=0.000
V=0.000  Nb=0.000  W=0.000

Analysis [%]

Source: calculated

Material low carbon

C= 0.060 Si=0.020 Mn=0.310 P=0.018
S=0.007 Cu=0.000 Cr=0.020
Ni=0.020 Al=0.027 Mo=0.000
Ti=0.000 V=0.000 Nb=0.000 W=0.000

Analysis [%]

Source: calculated

Material low carbon

C= 0.060 Si=0.020 Mn=0.310 P=0.018
S=0.007 Cu=0.000 Cr=0.020
Ni=0.020 Al=0.027 Mo=0.000
Ti=0.000 V=0.000 Nb=0.000 W=0.000

Analysis [%]

Source: calculated
Material stainless

C= 0.500  Si=0.030  Mn=0.500  P=0.015
S=0.008  Cu=0.100  Cr=12.12
Ni=12.10  Al=0.050  Mo=0.010  Ti=0.002
V=0.004  Nb=0.002  W=0.000

Analysis [%]

Source: calculated

Material stainless

C= 0.500  Si=0.030  Mn=0.500  P=0.015
S=0.008  Cu=0.100  Cr=12.12
Ni=12.10  Al=0.050  Mo=0.010  Ti=0.002
V=0.004  Nb=0.002  W=0.000

Analysis [%]

Source: calculated

Material stainless

C= 0.500  Si=0.030  Mn=0.500  P=0.015
S=0.008  Cu=0.100  Cr=12.12
Ni=12.10  Al=0.050  Mo=0.010  Ti=0.002
V=0.004  Nb=0.002  W=0.000

METHOD AND SYSTEM FOR THE OPEN-LOOP AND/OR CLOSED-LOOP CONTROL OF A HEATING OF A CAST OR ROLLED METAL PRODUCT

RELATED APPLICATIONS

This application is a National Stage application of International application PCT/EP2016/076660 filed Nov. 4, 2016 and claiming priority of German applications DE 102015223767.2 filed Nov. 30, 2015 and DE 102016200077.2 filed Jan. 7, 2016, all of the above-mentioned applications are incorporated herein by reference thereto.

The invention relates to a method for the open-loop and/or closed-loop control of a heating of a cast or rolled metal product.

The invention further relates to a system for heating a cast or rolled metal product, comprising at least one furnace or at least one heater into which the metal product can be inserted for heating, and at least one open-loop and/or closed-loop control device for open-loop and/or closed-loop control of the heating.

A casting method for producing a cast metal product is known from DE 10 2011 082 158 A1. Here, the temperature distribution prevailing in the interior of the material product is calculated by means of a temperature calculation model based on dynamic closed-loop temperature control (dynamic solidification control). In a calculation step, the total enthalpy of the system formed by the metal product is determined and is processed as an input variable in the temperature calculation model. One or more output variable(s) of the temperature calculation model is/are used in the closed-loop or open-loop control of the casting process. The total enthalpy is calculated from the sum of the free molar enthalpies (Gibbs energy) of all phases and/or phase fractions currently present in the metal product.

It is also known that a cast metal product, such as a slab or a metal billet is heated after casting to prepare the temperature of the metal product for a subsequent treatment, for example a bending or straightening process, and/or to influence the microstructures of the metal product, for example to dissolve precipitates within the metal product. The metal product is typically heated using a furnace, which the cast metal products pass through as part of a continuous casting process, particularly in so-called CSP (compact strip production) plants.

When a metal product is heated, it should be ensured that the temperatures in the metal product are not too low to ensure dissolution of specific precipitates. In addition, if an optimum furnace inlet temperature is not reached within the metal product, any microstructure transformations that may be desired cannot be performed at the desired quality, or increased energy must be provided to heat the metal product in the furnace. In addition, it should also be ensured when heating a metal product that the temperatures in the metal product are not too high, which would be accompanied by a high degree of dissolution of precipitates within the metal product, resulting in considerable grain growth. Knowing the temperature distribution within a cast metal product is therefore of fundamental importance for operating a furnace.

Pyrometers can be used, for example, to detect the surface temperature of a cast metal product. The temperatures in the interior of the metal product can in principle not be measured using a pyrometer, such that a temperature distribution within the metal product depending on process conditions can only be determined using a temperature calculation model.

The temperature distribution within the metal product is determined based on Fourier's heat equation $$\rho c_p = \frac{\partial T}{\partial t} - \frac{\partial}{\partial s}\left(\lambda \frac{\partial T}{\partial s}\right) = Q \quad (1)$$

wherein $\rho$ is the density, $c_p$ the specific heat capacity at constant pressure, T the calculated absolute temperature in Kelvin, t the time, s the position coordinate, $\lambda$ the coefficient of heat conductivity, and Q the energy liberated from the system formed by the metal product during a phase conversion. In the temperature calculation model, the energy liberated during the phase conversion is determined using the equation $$Q = \rho L \frac{\partial f_s}{\partial t} \quad (2)$$

wherein Q is the energy liberated during the phase conversion, $\rho$ is the density, L latent melt heat, t the time, and $f_s$ the system's degree of phase conversion. The total enthalpy H is derived from the calculation of the specific heat capacity according to the equation $$H = \int c_p \partial T \quad (3)$$

Particularly important required input variables of the heat equation are heat conductivity, density, and total enthalpy, since these variables have a major influence on the temperature result. Heat conductivity or the coefficient of heat conductivity and density are functions of the temperature, the chemical composition of the metal product and the respective phase fraction and can be precisely determined by experiment. But the total enthalpy cannot be measured and can only be inaccurately described using approximation equations for specific chemical compositions of the metal product, particularly iron alloys or steel alloys. Consequently, the subsequent numerical solution of the heat equation will lead to inaccurate temperature results. In addition, new measurements of heat conductivity and density must be newly performed for the respective material if chemical compositions change. Another way of determining heat conductivity and density is the determination of regression equations which describe the respective material. Since the values for heat conductivity and density change dramatically at phase boundaries, all regression equations without knowing the phase boundaries will yield inaccurate values.

For example, Schwerdtfeger, editor of "Metallurgie des Stranggiessens" [Metallurgy of Continuous Casting], Verlag Stahleisen mbH, 1992, presents in his book empirical regression equations for the enthalpy of unalloyed carbon steels, which can be used within specific narrow analytical limits with workable accuracy. But these regression equations are approximation equations and have no physical basis. In "Die wichtigsten physikalischen Eigenschaften von 52 Eisenwerkstoffen" [The Most Important Physical Properties of 52 Ferrous Materials], Verlag Stahleisen Dusseldorf, 1973, Richter provides an exact thermodynamic relationship for the enthalpy in each phase for pure iron. But pure iron has no technological significance. There is no exact thermodynamic information for the total enthalpy of a system for steel materials.

Consequently, the numerical solution of Fourier's heat equation will yield inaccurate results. The disadvantage of prior art is that they solve Fourier's heat equation using numerical methods, which provide a temperature result, that is, a temperature distribution within the metal product depending on the quality of the input data, such that the result obtained leads to deviations between the calculated temperature distribution or temperature and the respective actually prevailing temperature distribution within the metal product, optionally documented by measurements, if the enthalpy input data is faulty or inaccurate.

It is a problem of the invention to optimize the heating of a cast or rolled metal product with respect to product quality and energy consumption.

This problem is solved by the independent claims. Advantageous embodiments are particularly described in the dependent claims, which alone or jointly in various combinations may represent an aspect of the invention.

A method and system for the open-loop and/or closed-loop control of a heating of a cast or rolled metal product comprises the steps of:

Determining the total enthalpy of the metal product from a sum of the free molar enthalpies (Gibbs energy) of all phases and/or phase fractions currently present in the metal product;

Determining a temperature distribution within the metal product by means of a dynamic temperature calculation model using the total enthalpy determined; and Open-loop and/or closed-loop controlling of the heating of the metal product as a function of at least one output variable of the temperature calculation model.

According to the invention, open-loop and/or closed-loop control of the heating of a cast or rolled metal product considers the temperature distribution within the metal product, which can be determined highly accurately from the total enthalpy of the metal product or the system formed thereof. This improves temperature prediction and control and allows a more accurate specification of the output temperature from a furnace or a heater, which is accompanied by energy saving and improved adjustment of the temperature needed for dissolving precipitates.

The total enthalpy of the metal product or the system formed thereof can be determined by means of the temperature calculation model and Gibbs energy at constant pressure according to the equation $$H = G - T\left(\frac{\partial G}{\partial T}\right)_p \quad (4)$$

wherein H is the molar enthalpy of the system, G is the Gibbs energy of the system, T is the absolute temperature in Kelvin, and p is the pressure of the system. Gibbs energy of the system for a mixture of phases can be determined via the Gibbs energy values of the phases or pure phases and their phase fractions. The following applies to steel, for example:

$$G = f^l G^l + f^{\gamma} G^{\gamma} + f^{pa} G^{pa} + f^{ea} G^{ea} + f^{ec} G^{ec} \quad (5)$$

wherein G is the Gibbs energy of the metal product or system, $f^\phi$ is the Gibbs energy fraction, also called the phase fraction, of the phase $\phi$ at the system, and $G^\phi$ is the Gibbs energy of the phase $\phi$. The Gibbs energy for the austenite, ferrite, and liquid phases can be determined from the equation $$G^\Phi = \sum_{i=1}^{n} x_i^\Phi G_i^\Phi + RT\sum_{i=1}^{n} x_i \ln x_i + {}^E G^\Phi + {}^{magn} G^\Phi \quad (6)$$

wherein $G^\Phi$ is the Gibbs energy of a respective phase $\phi$, $x_i^\Phi$ is the mole fraction of the i-th component of the respective phase $\phi$, $G_i^\Phi$ is the Gibbs energy of the respective i-th component of the respective phase $\phi$, R is the universal gas constant, T the absolute temperature in Kelvin, ${}^E G^\Phi$ the Gibbs energy for a non-ideal mixture, and ${}^{magn} G^\Phi$ the magnetic energy of the system. The Gibbs energy for a non-ideal mixture can be determined using the equation $$^E G^\Phi = \Sigma x_i x_j {}^a L_{i,j}^\Phi (x_i - x_j)^a + \Sigma x_i x_j x_k L_{i,j,k}^\Phi \quad (7)$$

wherein ${}^E G^\Phi$ is the Gibbs energy for a non-ideal mixture, $x_i$ is the mole fraction of the i-th component, $x_j$ the mole fraction of the j-th component, $x_k$ the mole fraction of the k-th component, a is a correction term, ${}^a L_{i,j}^\Phi$ are interaction parameters of different order, and ${}^a L_{i,j,k}^\Phi$ and ${}^a L_{i,j}^\Phi$ interaction parameters of different order of the overall system. The proportion of magnetic energy can be determined using the equation $$^{magn} G^\Phi = RT \ln(1+\beta) f(\tau) \quad (8)$$

wherein ${}^{magn} G^\Phi$ is the magnetic energy of the system, R the universal gas constant, T the absolute temperature in Kelvin, $\beta$ the magnetic moment, and f(T) the fraction of the overall system as a function of the normalized Curie temperature of the overall system. In the above equation (5) for the Gibbs energy of a mixture of phases, the individual terms correspond to the single element energy, a contribution to an ideal mixture, and a contribution to a non-ideal mixture and the magnetic energy of the system. If the Gibbs energy of the system is known, it can be used to derive the molar specific heat capacity using the equation $$c_p = -T\left(\frac{\partial^2 G}{\partial T^2}\right)_p \quad (9)$$

wherein c is the molar specific heat capacity of the system, T the absolute temperature in Kelvin, and G the Gibbs energy of the system. The parameters of the terms of the above equations (6)-(8) are listed in a Thermocalc and MatCalc database and can be used to determine the Gibbs energy values of a steel composition. The total enthalpy of the steel composition can be derived using a mathematical derivative.

The metal product is preferably manufactured by casting a steel or iron alloy. The metal product may be configured as a slab or billet.

The metal product may be heated, for example, in the form of preheating or intermediate heating, particularly reheating.

According to an advantageous embodiment, a density is determined for each phase and phase boundaries between the phases are determined, wherein a density distribution of the metal product is determined based on the densities of the determined phases and the determined phase boundaries. The phase boundaries can be determined using the Gibbs energy values. The density distribution of the metal product can be determined using the phase boundaries as a function of temperature and the phase fractions. Exact knowledge of the density distribution of the metal product makes it possible to determine the temperature distribution of the metal product more accurately.

According to another advantageous embodiment, a heat conductivity is determined for each phase and phase boundaries between the phases are determined, wherein a heat conductivity curve of the metal product is determined based on the determined heat conductivities of the phases and the determined phase boundaries. The phase boundaries can be determined using the Gibbs energy values. The heat conductivity curve of the metal product can be determined using the phase boundaries as a function of temperature and the phase fractions. Exact knowledge of the heat conductivity curve of the metal product makes it possible to determine the temperature distribution of the metal product more accurately. In addition to the specific heat capacity $c_p$, which can be calculated from the enthalpy and thus from the phase fractions, the temperature-dependent density p and the temperature-dependent heat conductivity A are included in Fourier's heat equation (1). Knowing the heat conductivity is extremely important when heating the metal product, since the temperature of the metal product can only be measured on the surface. But to be able to dissolve all precipitates, such as carbon nitrides, the local temperature of the metal product must be above the limit over the entire cross section, particularly in a colder "cold spot" region, of the metal product. But the inner local temperatures of the metal product cannot be measured, they can only be calculated. Knowing the temperature-dependent heat conductivity as exactly as possible is a prerequisite for this. The heat conductivity $\lambda$ can be determined experimentally. Regression equations for determining heat conductivity in a pure phase, that is, $\lambda_\gamma$ and $\lambda_\alpha$, can be used here. The transition temperatures and from there the heat conductivity curve can be determined from the determined phase boundaries: $T>T_{\gamma\alpha}$ for $\lambda=\lambda_\gamma$, $T<T_{ce}$ for $\lambda=\lambda_\alpha$ and $T_{ce}<T<T_{\gamma\alpha}$ for $\lambda=\lambda_\gamma P_\gamma + \lambda_\alpha P_\alpha$ with the calculated phase fractions $P_\gamma$ and $P_\alpha$.

In another advantageous embodiment, transition temperatures at which a transition from one phase into another is initiated are determined based on the phase boundaries. Particularly, transition temperatures are determined from the minimum of the Gibbs energy values. In nature, it is preferred to assume the phase in which the energy is minimal ("principle of minimum energy"). In this way, the phase with the lowest Gibbs energy can be determined from the energy values of the pure phases. In addition, two-phase regions can be determined by forming tangents. This is outlined in FIGS. 2 and 4.

According to another advantageous embodiment, a length in time of the heating is determined based on a predetermined target temperature distribution within the metal product, a chemical composition of the metal product, and at least one property of a furnace or heater used for heating. A surface temperature of the metal product can be measured before and/or after heating. The chemical composition of the metal product can originate from a previous chemical analysis of the metal product or from a material tracking system. The target temperature distribution can be determined and predefined by the temperature calculation model. This means that the so-called heating-up time needed for reaching a minimum temperature limit and a sufficiently balanced temperature profile of the metal product can be determined exactly. In addition, an annealing time can be determined, which is required to dissolve precipitates as desired. Thus the length in time of the heating needed until the metal product has reached a predetermined target temperature or the desired dissolution of precipitates is completed can be determined from the determined temperature distribution of the metal product and the predetermined furnace temperature or heating temperature.

According to another advantageous embodiment, a target temperature required for heating which is applied to the metal product is determined based on a predetermined target temperature distribution of the metal product, a surface temperature of the metal product, a chemical composition of the metal product, at least one property of a furnace or heater used for heating, and a predetermined conveying speed of the metal product on the one hand or a predetermined waiting time of the metal product on the other hand. The exact calculation of the temperature to which the product is heated allows energy savings compared to conventional heating processes in which furnace or heater temperatures can be used that are too high because the determination of the temperature distribution was less exact. A more exact open-loop and/or closed-loop temperature control, on the other hand, can ensure that the application of heat to the metal product is sufficient to achieve a desired dissolution of precipitates.

A system according to the invention for heating a cast or rolled metal product includes at least one furnace or at least one heater into which the metal product can be inserted, and at least one open-loop and/or closed-loop control device for open-loop and/or closed-loop control of the heating process, wherein said open-loop and/or closed-loop control device is configured for performing the method according to one of the above embodiments or any combination thereof.

The advantages mentioned above with respect to the method are accordingly associated with the system. The furnace can for example be a furnace, particularly a tunnel furnace, of a CSP plant, a continuous casting plant, a hot strip mill, a heavy plate mill, a round rolling mill, a profile rolling mill, or a strip rolling mill. The furnace or heater can be arranged at any point of a production process where materials are to be heated.

The invention will be explained using examples with reference to the enclosed figures below, wherein the features explained below can represent an aspect of the invention either alone or jointly in various combinations with one another. Wherein:

FIG. 1: shows a representation of Gibbs energy for pure iron;

FIG. 2: shows a (construed) phase diagram with Gibbs energy values;

FIG. 3: shows a total enthalpy curve according to Gibbs for a low-carbon (LC) steel;

FIG. 4: shows a curve of the phase fractions according to Gibbs for a low-carbon (LC) steel;

FIG. 5: shows a density curve for a low-carbon (LC) steel with the calculated phase fractions;

FIG. 6: shows a heat conductivity curve for a low-carbon (LC) steel with the calculated phase fractions;

FIG. 7: shows a curve of the phase fractions according to Gibbs for a high-alloy steel (austenitic stainless steel);

FIG. 8: shows a density curve for a high-alloy steel (austenitic stainless steel);

FIG. 9: shows a heat conductivity curve for a high-alloy steel (austenitic stainless steel);

FIG. 10: shows a schematic view of an exemplary embodiment of a system according to the invention;

FIG. 11: shows a schematic view of an application example of the invention;

FIG. 12: shows a schematic view of an exemplary embodiment of a system according to the invention; and FIG. 13: shows a temperature curve of a metal product in a furnace.

Figure 1:
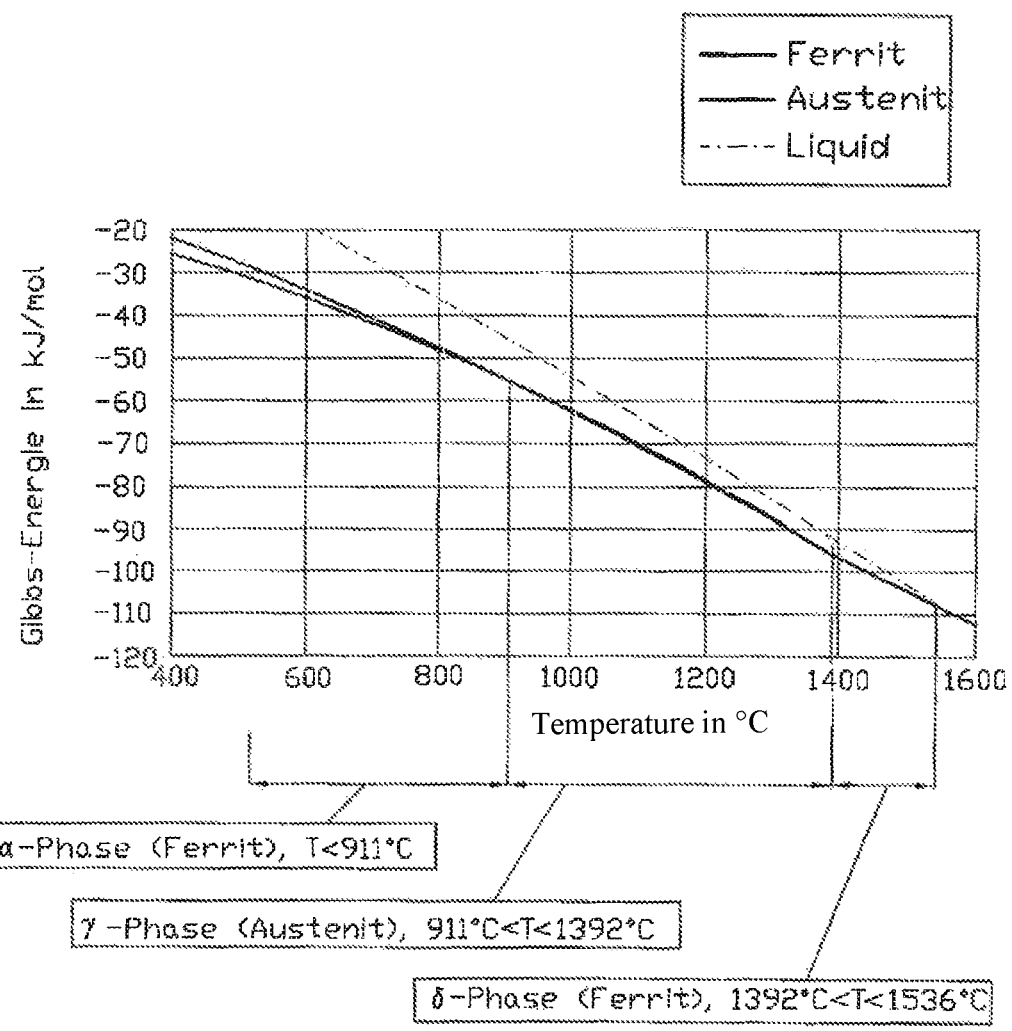
FIG. 1 shows a representation of Gibbs energy for pure iron. It is apparent that the ferrite, austenite, and liquid phases each assume a minimum at which these phases are stable for a specific characteristic temperature range.
Figure 2:
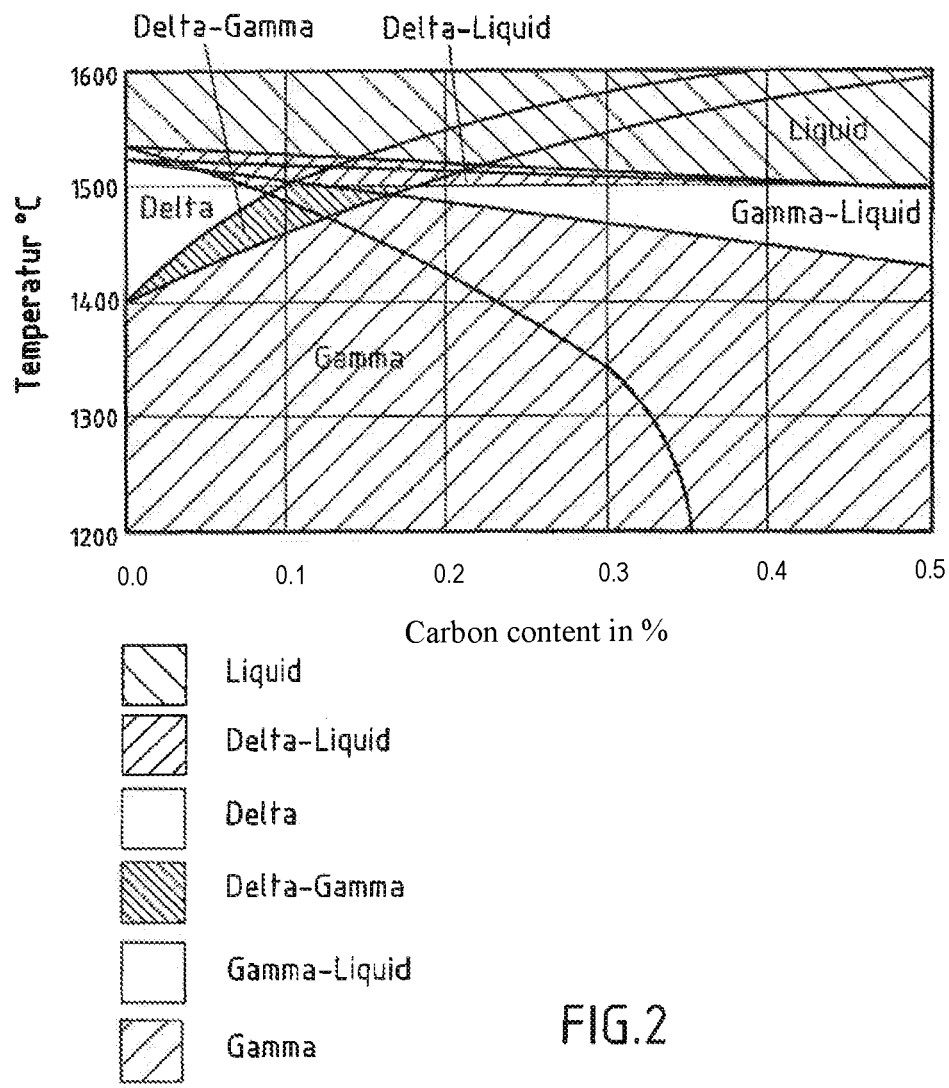
FIG. 2 shows the phase boundaries of a Fe—C alloy of 0.02% Si, 0.310% Mn, 0.018% P, 0.007% S, 0.02% Cr, 0.02% Ni, 0.027% Al and a variable C content. Formulation of the Gibbs energy allows the construction of such a phase diagram with any desired chemical composition and to represent the stable phase fractions.
Figure 3:
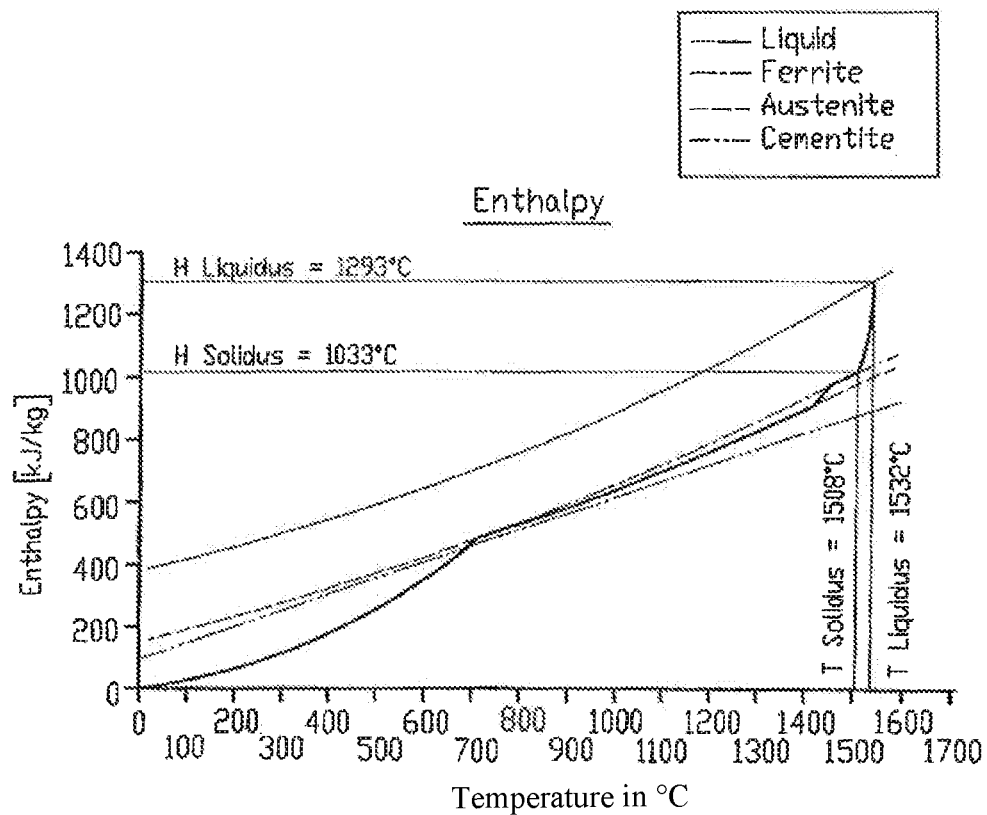
FIG. 3 shows a total enthalpy curve according to Gibbs for a low-carbon (LC) steel as a function of temperature. The solidus and liquidus temperatures are also shown in the figure.
Figure 4:
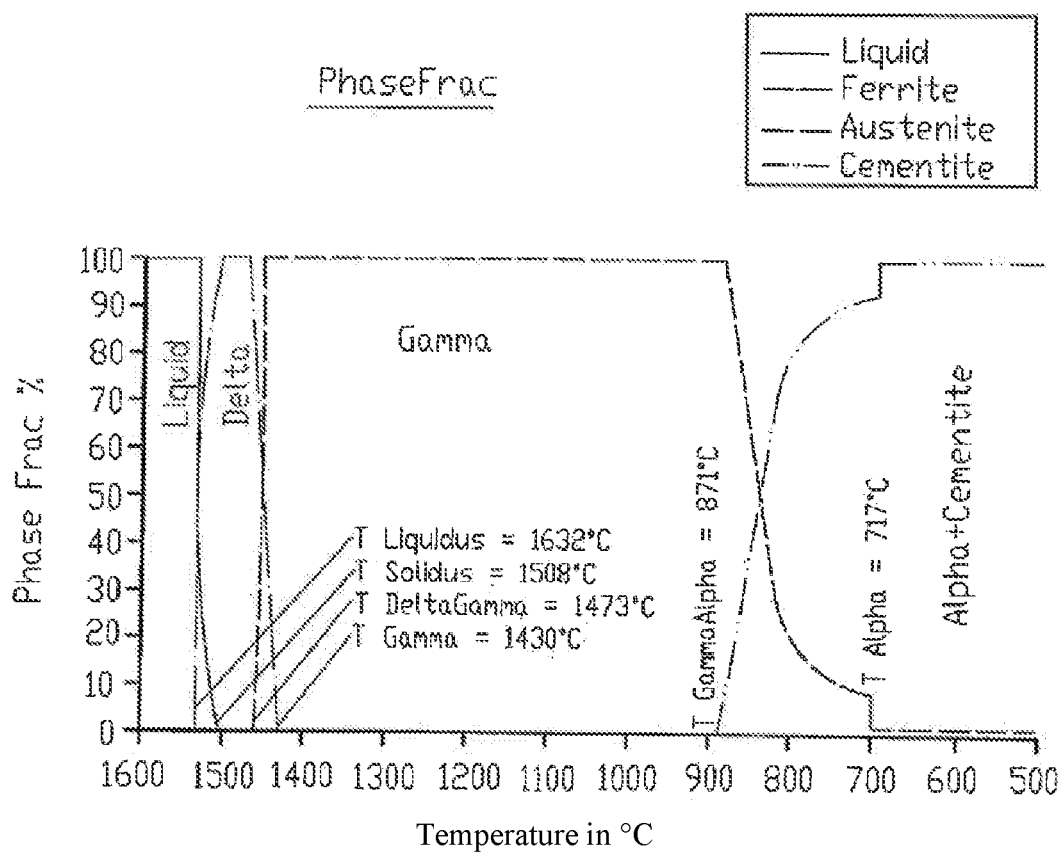
FIG. 4 shows a curve of the phase fractions according to Gibbs for a low-carbon (LC) steel as a function of temperature. The ranges of the melt, of the delta, gamma, alpha, and cementite phases are identifiable in FIG. 4.
Figure 5:
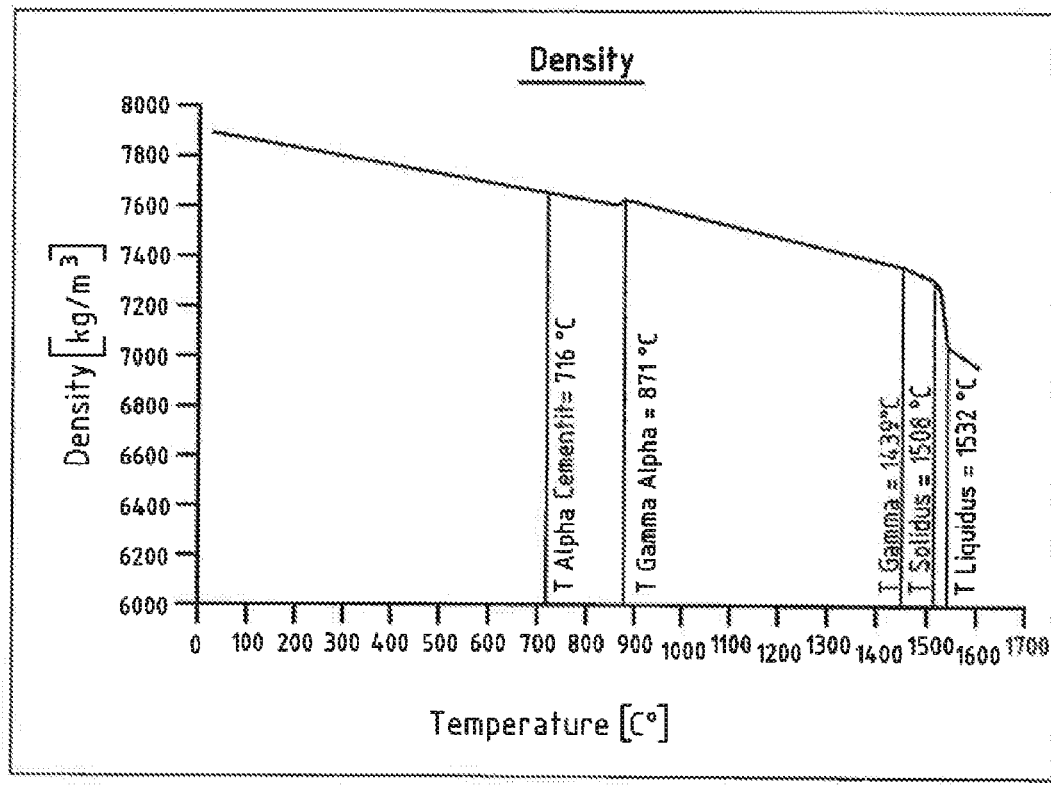

FIG. 5 shows a density curve for a low-carbon (LC) steel with the calculated phase fractions as a function of temperature and the calculated phase boundaries. The density of each phase is determined via separate regression equations. The phase boundaries are needed for determining the overall density curve.

Figure 6:
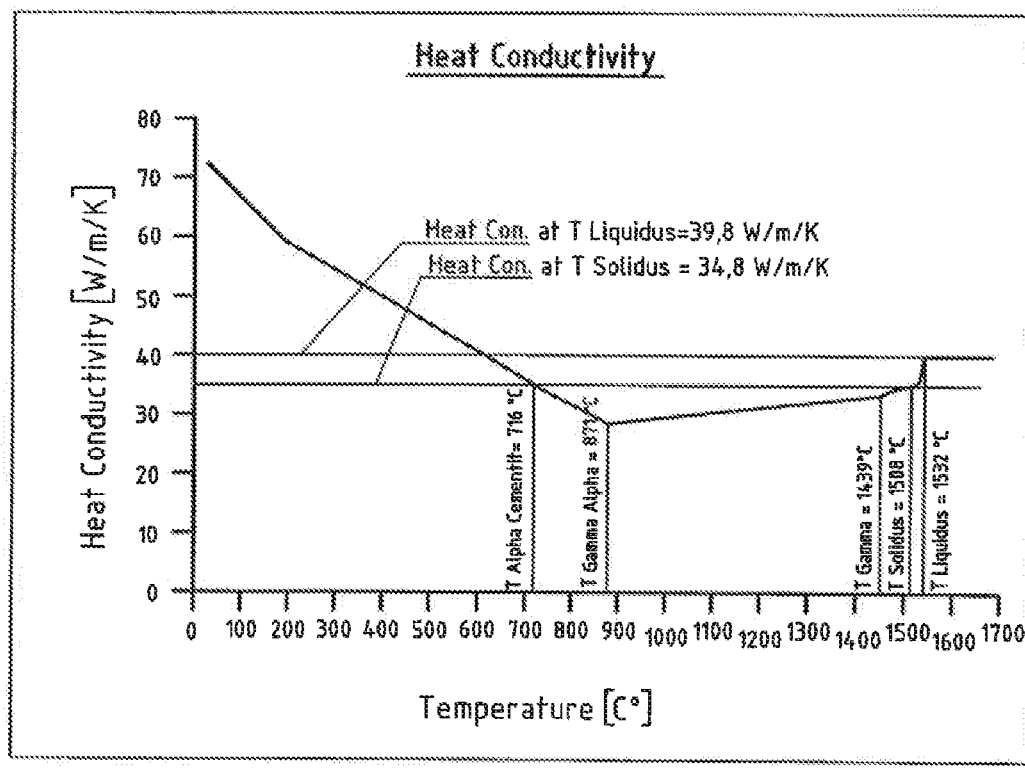

FIG. 6 shows a heat conductivity curve for a low-carbon (LC) steel with the calculated phase fractions. Like for calculating the density, the coefficient of heat conductivity is calculated from regression equations for each phase here. The phase fractions are needed once again to determine the overall curve of heat conductivity.

Figure 7:
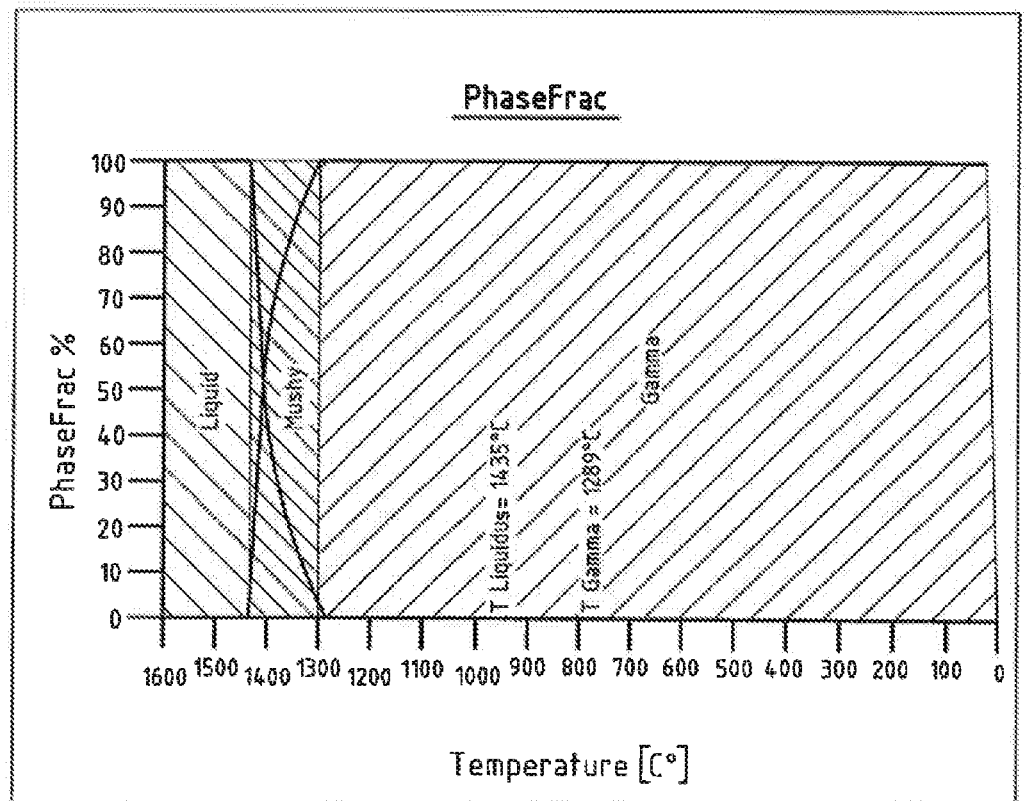
Figure 7:
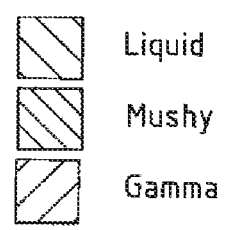

FIG. 7 shows a curve of the phase fractions according to Gibbs for a high-alloy steel (austenitic stainless steel) containing about 12% chromium and about 12% nickel. The austenitic steel no longer transitions from gamma to alpha.

Figure 8:
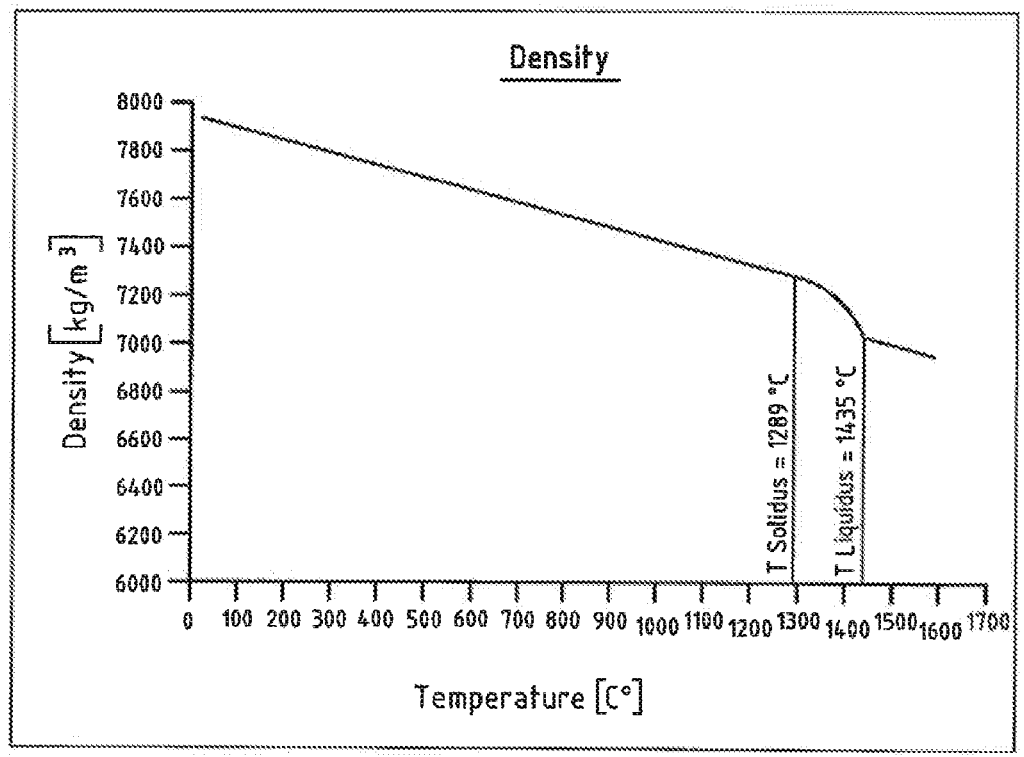

FIG. 8 shows a density curve for a high-alloy steel (austenitic stainless steel). The density drop during the phase transition from gamma to alpha (otherwise at about 800° C.) is eliminated.

Figure 9:
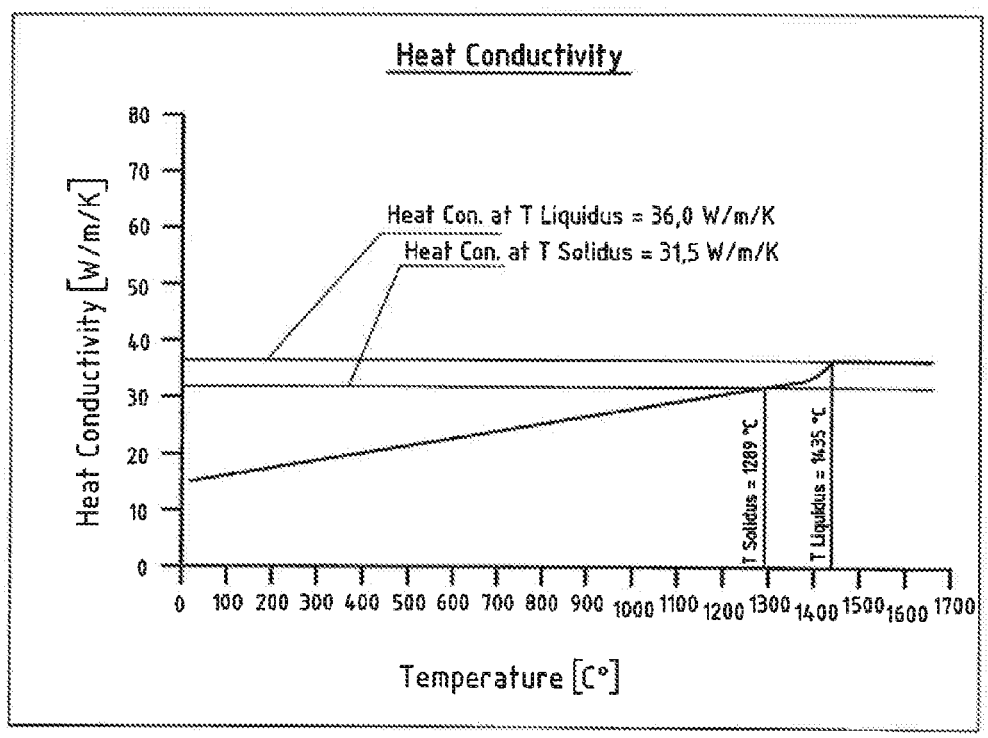

FIG. 9 shows a heat conductivity curve for a high-alloy steel (austenitic stainless steel). Since the alpha phase does not occur, the coefficient of heat conductivity drops to about 14 W/(mK) at 25° C.

Figure 10:
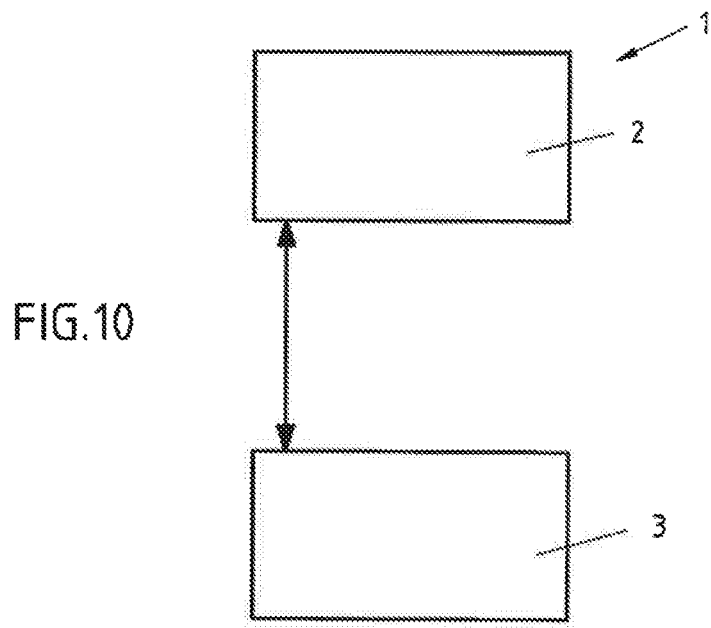

FIG. 10 shows a schematic view of an exemplary embodiment of a system 1 according to the invention for heating a cast or rolled metal product not shown here. The system 1 includes a furnace 2 into which the metal product can be inserted for heating. Furthermore, the system 1 includes an open-loop and/or closed-loop control device 3 for open-loop and/or closed-loop controlling of the heating process.

The open-loop and/or closed-loop control device 3 is configured for performing a method for open-loop and/or closed-loop controlling of a heating of a cast or rolled metal product, comprising the steps of:

Determining the total enthalpy of the metal product from a sum of the free molar enthalpies (Gibbs energy) of all phases and/or phase fractions currently present in the metal product;

Determining a temperature distribution within the metal product by means of a dynamic temperature calculation model using the total enthalpy determined; and Open-loop and/or closed-loop controlling of the heating of the metal product as a function of at least one output variable of the temperature calculation model.

Furthermore, the open-loop and/or closed-loop control device 3 may be configured for determining a density, phase boundaries between the phases, and a density distribution of the metal product based on the determined phase densities and the determined phase boundaries. Furthermore, the open-loop and/or closed-loop control device 3 may be configured for determining a heat conductivity, phase boundaries between the phases, and a heat conductivity curve of the metal product based on the determined thermal conductivities of the phases and the determined phase boundaries. The open-loop and/or closed-loop control device 3 can also be configured for determining transition temperatures at which a transition from one phase into another is initiated, based on the phase boundaries.

The open-loop and/or closed-loop control device 3 can also be configured for determining a length in time of the heating based on a predetermined target temperature distribution within the metal product, a chemical composition of the metal product, and at least one property of a furnace 2 used for heating. The open-loop and/or closed-loop control device 3 can also be configured for determining a target temperature required for heating which is applied to the metal product based on a predetermined target temperature distribution of the metal product, a surface temperature of the metal product, a chemical composition of the metal product, at least one property of a furnace 2 used for heating, and a predetermined conveying speed of the metal product on the one hand or a predetermined waiting time of the metal product on the other hand.

The open-loop and/or closed-loop control device 3 can also be configured for determining whether the local temperatures of the metal product are greater than an discharge temperature at all calculation positions. If this is true, the metal product can be discharged from the furnace 2. If this is not true, however, the metal product must remain in the furnace 2 for further temperature equilibration until it is established using the temperature calculation model that the local temperatures of the metal product are greater than a discharge temperature at all calculation positions.

Figure 11:
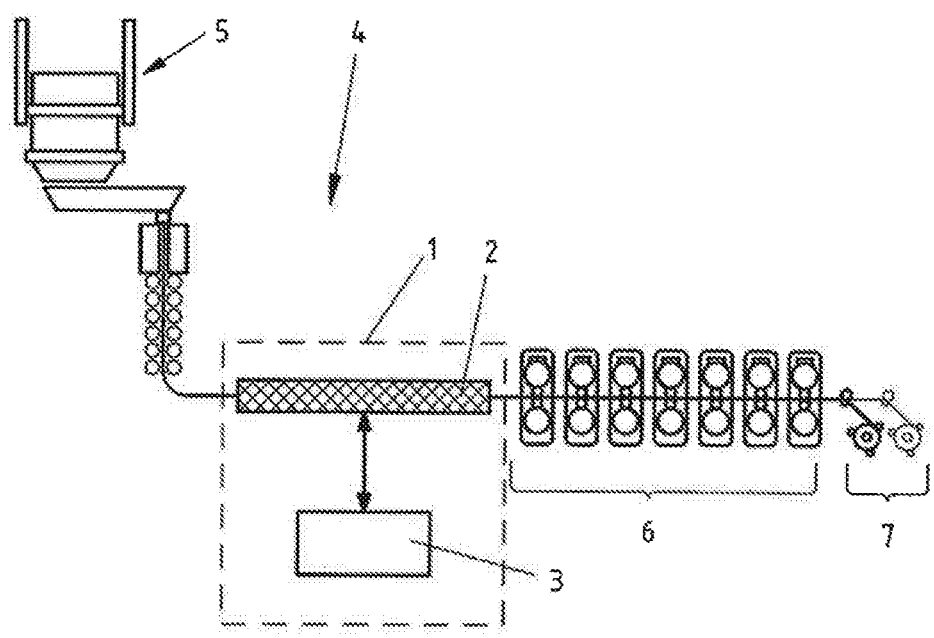

FIG. 11 shows a schematic view of an application example of the invention. It depicts an CSP plant 4, which comprises a casting plant 5, a tunnel furnace 2, a hot rolling mill 6, and a coiling device 7. The tunnel furnace 2 is part of a system 1 according to the invention, as described with reference to FIG. 10.

Figure 12:
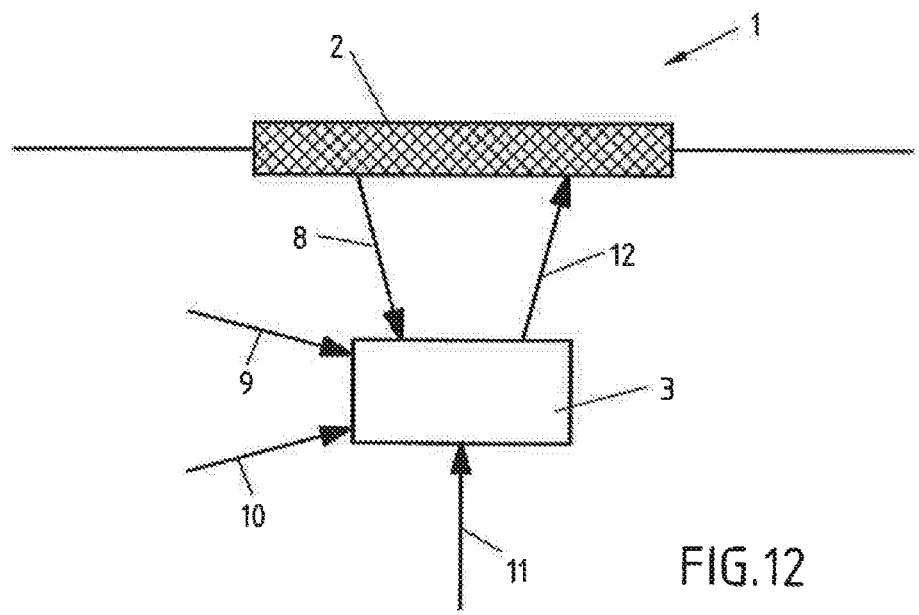

FIG. 12 shows a schematic view of an exemplary embodiment of a system 1 according to the invention. The system 1 can in principle be designed as shown in FIG. 10, which is why we make reference to the above description of FIG. 10 to avoid repetition. The furnace 2 is designed as a tunnel furnace. The open-loop and/or closed-loop control device 3 contains a furnace model with an integrated temperature calculation model. The open-loop and/or closed-loop control device 3 is fed data on the instantaneous and maximum burner power of the furnace 2 according to the arrow 8. According to the arrow 9, the open-loop and/or closed-loop control device 3 is fed temperatures at each burner position stemming from the caster model and from measured values. According to the arrow 10, the open-loop and/or closed-loop control device 3 is fed analytical data from material tracking regarding the chemical composition of the metal product. According to the arrow 11, the open-loop and/or closed-loop control device 3 is fed discharge temperatures and annealing times from a material calculation and/or from empirical values. According to the arrow 12, the open-loop and/or closed-loop control device 3 is fed calculated burner power values for each furnace chamber of the furnace 2 required to achieve an optimum annealing temperature and an optimum annealing time or corresponding data.

Figure 13:
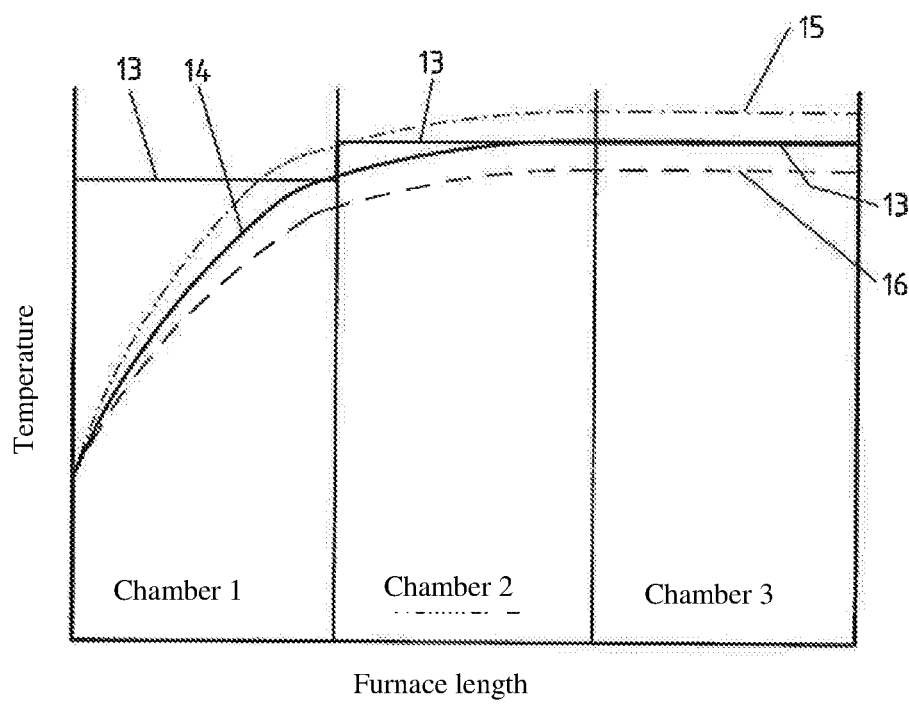

FIG. 13 shows a temperature curve of a metal product in a furnace. On the one hand, it shows the target temperature 13 for each of the three chambers of the furnace. In addition, the temperature curve 14 determined for the heating according to the method of the invention is represented. Furthermore, a conventionally calculated, incorrect temperature curve 15 is shown where the calculated temperature is too high, which is accompanied by an unnecessary loss of energy. Furthermore, a conventionally calculated, incorrect temperature curve 16 is shown where the calculated temperature is too low, and as a result, precipitates are not dissolved as desired.

LIST OF REFERENCE SYMBOLS

1 System
2 Furnace
3 Open-loop and/or closed-loop control device
4 CSP plant
5 Casting plant
6 Hot rolling mill
7 Coiling device
8 Arrow (data flow)
9 Arrow (data flow)
10 Arrow (data flow)
11 Arrow (data flow)
12 Arrow (data flow)
13 Target temperature
14 Temperature curve
15 Incorrect temperature curve
16 Incorrect temperature curve

The invention claimed is:

1. A system for heating a cast or rolled metal product, comprising:
   at least one furnace or at least one heater configured for insertion and heating of the metal product therein in a heating process; and
   at least one open loop and/or closed loop control device for open-loop and/or closed-loop control of the heating process, said open loop and/or closed loop control device operatively connected with the furnace or heater and configured to perform a method, comprising the steps of
   Determining a total enthalpy of the metal product from a sum of the free molar enthalpies (Gibbs energy) of all phases and/or phase fractions currently present in the metal product;
   Determining a temperature distribution within the metal product by means of a dynamic temperature calculation model using the total enthalpy determined;
   Open-loop and/or closed-loop controlling of the furnace or the heater to control the heating of the metal product performed by the furnace or the heater as a function of at least one output variable of the temperature calculation model.

2. The system according to claim 1, characterized in that a density is determined for each phase and phase boundaries between the phases are determined, wherein a density distribution of the metal product is determined based on the densities of the determined phases and the determined phase boundaries.

3. The system according to claim 1, characterized in that a heat conductivity is determined for each phase and phase boundaries between the phases are determined, wherein a heat conductivity curve of the metal product is determined based on the determined heat conductivities of the phases and the determined phase boundaries.

4. The system according to claim 2, characterized in that transition temperatures at which a transition from one phase into another is initiated are determined based on the phase boundaries.

5. The system according to claim 1, characterized in that a length in time of the heating is determined based on a predetermined target temperature distribution within the metal product, a chemical composition of the metal product, and at least one property of a furnace (2) or heater used for heating.

6. The system according to claim 1, characterized in that a target temperature required for heating which is applied to the metal product is determined based on a predetermined target temperature distribution of the metal product, a surface temperature of the metal product, a chemical composition of the metal product, at least one property of a furnace (2) or heater used for heating, and a predetermined conveying speed of the metal product on the one hand or a predetermined waiting time of the metal product on the other hand.

* * * * *